United States Patent [19]
Gellert

[11] 3,822,856
[45] July 9, 1974

[54] HOT RUNNER HEATER

[76] Inventor: Jobst Ulrich Gellert, 227 Viewmount Ave., Toronto 19, Ontario, Canada

[22] Filed: Jan. 2, 1973

[21] Appl. No.: 320,505

[30] Foreign Application Priority Data
 Nov. 21, 1972  Canada.............................. 157346

[52] U.S. Cl............................... 247/105, 425/247
[51] Int. Cl............................................... B29f 1/02
[58] Field of Search............ 249/105; 425/DIG. 229, 425/247, 250

[56] References Cited
UNITED STATES PATENTS
| | | | |
|---|---|---|---|
| 3,213,490 | 10/1965 | Johnson.......................... | 425/250 X |
| 3,661,487 | 5/1972 | Susin................................ | 425/247 |
| 3,663,145 | 5/1972 | Teraoka........................... | 425/250 |

*Primary Examiner*—Milton S. Mehr

[57] ABSTRACT

This invention relates to a heater forming part of a hot runner manifold system used in hot edge gate injection molding of plastics. The heater has a main body portion with a heating element and a nozzle having several nozzle openings through which molten plastic may be injected into several different mold cavities at the same time. The heater is located and mounted in such a way as to disperse effective even heat in two directions, downwards towards the edge gate and upward to the manifold. The nozzle member is generally conical shaped and has a number of equally radially spaced longitudinally extending convex portions containing the nozzle openings. The convex portions are shaped to transfer sufficient heat from the heating element in the main body portion to maintain the plastic in the nozzle openings in the molten state, while not excessively heating the plastic in the nearby mold cavities.

5 Claims, 7 Drawing Figures

HOT RUNNER HEATER

BACKGROUND OF THE INVENTION

This invention relates generally to hot runner manifold systems used in the plastic injection molding field, and more particularly to a heater used in such a system for hot runner edge gate or hot edge gate molding.

In this highly automated industry it is desirable to quickly produce a large number of units having minimum defects using a minimum amount of apparatus and producing a limited amount of waste. In the past, hot runner molding machines used with multiple cavity molds have been employed with manifold systems which each have a number of nozzle members projecting therefrom, each nozzle member having its own heating element. In addition to the expense of producing these relatively complex manifold systems, they have the disadvantage that temperature controls are required for each nozzle member thereby resulting in additional capital cost.

More recently, heaters have been used which enable only one heater element to be used with several nozzle members. These heaters have a central main body portion with a number of nozzle members projecting therefrom. Each of the nozzle members has a single nozzle opening which leads to one cavity in the mold. The main body portion is provided with a heating element and the heater is formed of conductive material which transfers the heat to the nozzle members. A heater of this type is disclosed in the applicant's U.S. Pat. No. 3,383,493 issued May 14, 1968.

While being a significant improvement to be able to combine several nozzle members with a single heater element (particularly in center gate molding), the applicant has discovered that in injection molding applications which are receptive to hot runner edge gate molding, a heater may be used which has one heater element and several nozzle openings on a single nozzle member. A major problem with this type of heater is that it is necessary to maintain a balanced heat flow from the heater element to each of the nozzle openings sufficient to keep the plastic in the molten state, while maintaining each of the mold cavities sufficiently cooled to quickly solidify the molten plastic in the cavities. In other words, a delicate balance must be maintained between the heat transfer characteristics of the heater, and the insulation and cooling characteristics of the mold. This, of course, must be done while providing for a solidified sprue to be formed in the gate to block flow of the molten plastic during removal of the formed product, but the size of the sprue must be kept to a minimum. As additional problem is that the heater block must be securely located to avoid lateral shifting relative to the cavities resulting from heat expansion of the manifold system.

SUMMARY OF THE INVENTION

Accordingly, it is an object of the present invention to provide a hot runner manifold system having a heater with a single heating element and a nozzle member with several nozzle openings which at least partially overcomes these problems.

To this end, in one of its aspects, the invention provides in a hot runner manifold system, a heater having a main body portion with heating means, a nozzle member extending from the main body portion with a plurality of nozzle openings, and an injection passage extending through the main body portion and the nozzle member to the nozzle openings, the nozzle member being generally conical shaped with a truncated outward end and a plurality of radially spaced longitudinally extending convex portions, each of said convex portions defining a corresponding one of said nozzle openings. The heater is located and mounted in such a way as to disperse effective even heat in two directions, downwards towards the edge gate and upward to the manifold.

BRIEF DESCRIPTION OF THE DRAWINGS

Further objects and advantages of the invention will appear from the following description taken together with the accompanying drawings in which.

DESCRIPTION OF THE PREFERRED EMBODIMENTS

Figure 3:
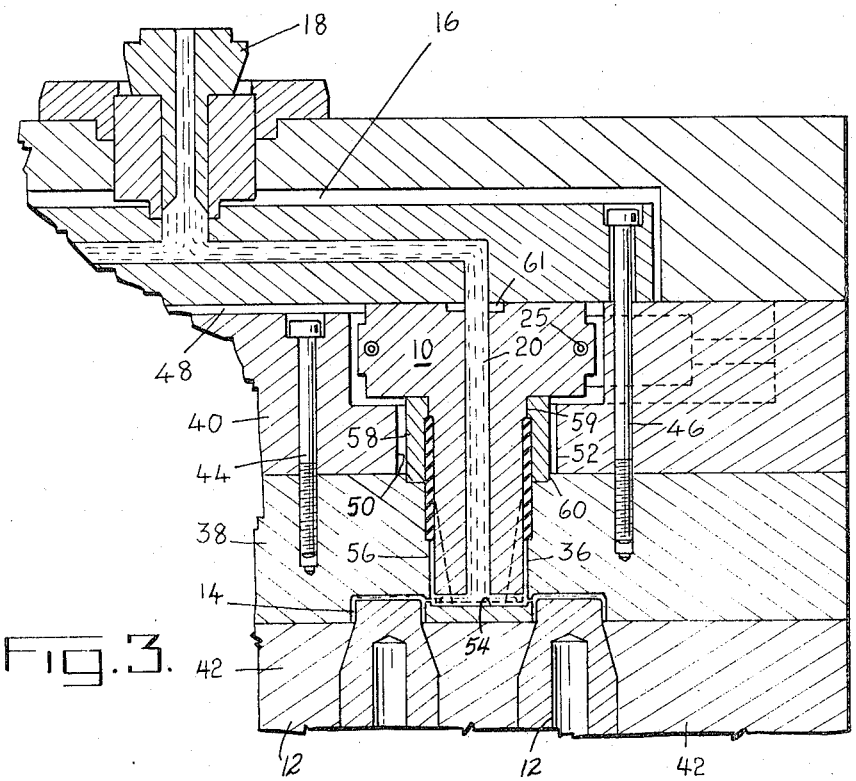
FIG. 3 is a sectional view showing a portion of a hot runner manifold system employing a heater according to the invention and a mold with a plurality of cavities.

Reference is first made to FIG. 3 which shows a portion of a hot runner manifold system having a heater 10 according to the invention and a hot edge gate mold 12 which defines cavities 14, typically shown to form container caps. The manifold system includes a spreader plate 16 supported by a number of heaters identical to heater 10 shown. For instance, the spreader plate 16 may be in the shape of a horizontal cross with three other symmetrically located heaters in addition to the heater 10 shown. In use, molten plastic flows from the molding machine 18, through the spreader plate 16, through injection passage 20 in the heater 10, and into the cavities 14 where it solidifies to form the product.

Figure 1:
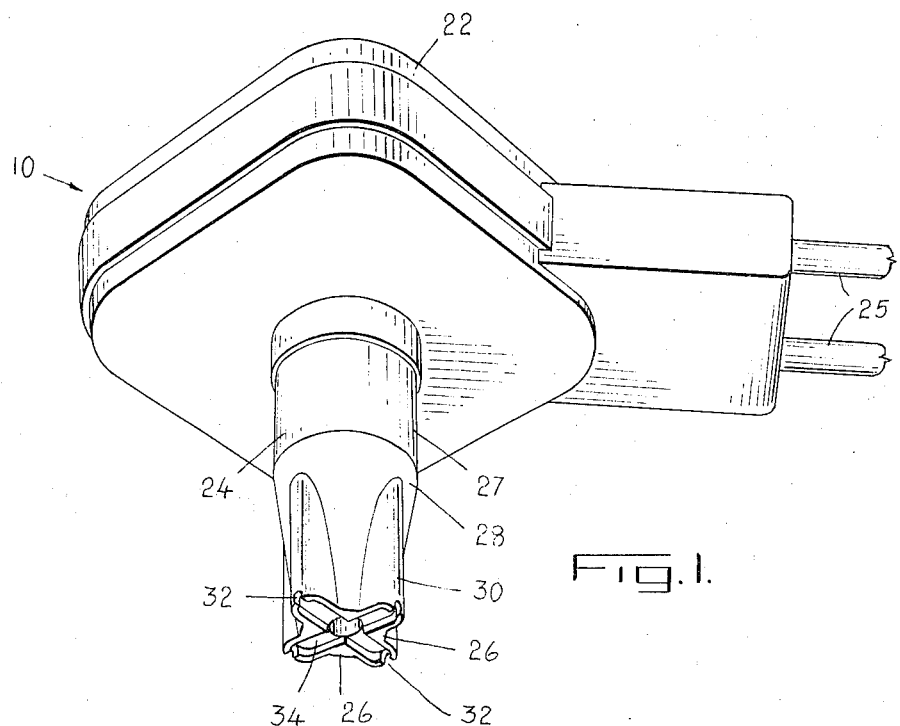
FIG. 1 is a perspective view of a hot runner heater according to a first embodiment of the invention.

In more detail, the heater 10, a first embodiment of which may be seen in FIG. 1, has a main body portion 22 and a nozzle member 24. The main body portion 22 and the nozzle member 24 are normally integrally formed, although they may be separately formed with an adaptor socket (not shown) included in the main body portion 22 to permit interchangeable nozzle members of various sizes and shapes to be used with a single main body portion 22. As disclosed in above mentioned U.S. Pat. No. 3,383,493, the main body portion 22 is preferably formed with an integral circular electrical heater element 25 which is connected to a suitable power supply (not shown) to heat the heater 10 to a sufficient temperature to maintain the plastic in the heater 10 in a molten state.

The nozzle member 24 is generally conical shaped, and extends from the main body portion 22 to an outward truncated end 26. The nozzle member 24 may have a cylindrical portion 27 adjacent the main body portion 22, as shown, to extend its length. As may be seen, the conical surface 28 of the nozzle member 24 is interupted by four equally radially spaced longitudinally extending convex portions 30 which terminate at outward end 26. Each of the convex portions 30 has a centrally located U-shaped nozzle opening or notch 32 extending from the outward end 26 of the nozzle member 24.

Figures 4, 6:
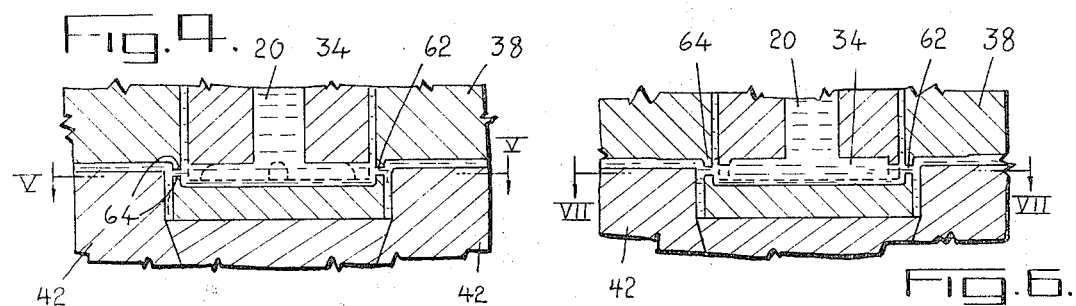
FIG. 4 is a partial sectional view showing the outward end of a nozzle member of a heater according to the first embodiment of the invention with adjacent mold cavities.
FIG. 6 is a partial sectional view showing the outward end of a nozzle member of a heater according to the second embodiment of the invention with adjacent mold cavities.
Figures 5, 7:
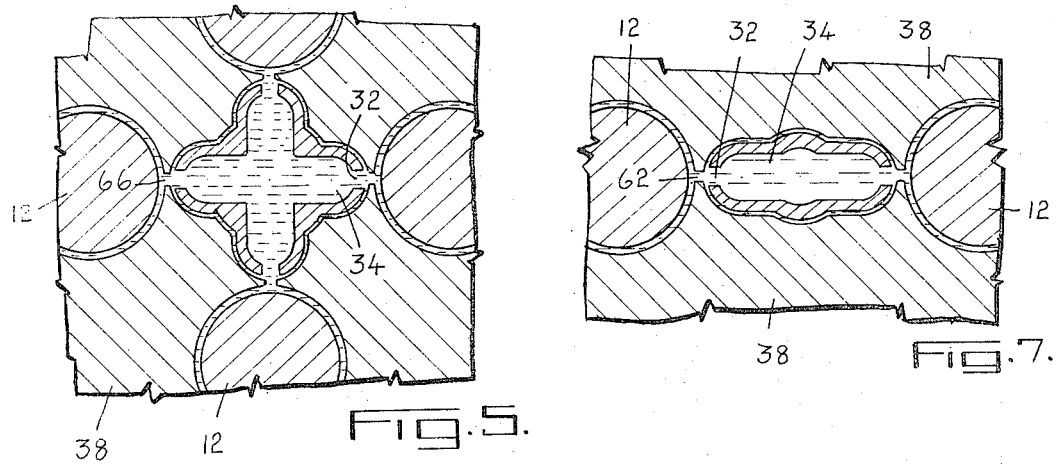
FIG. 5 is a sectional view taken along line V—V in FIG. 4.
FIG. 7 is a sectional view taken along line VII—VII in FIG. 6.

As clearly seen in FIGS. 4 and 5, injection passage 20 which extends centrally through the main body portion 22 and the nozzle member 24 of the heater 10 divides into radial channels 34 adjacent the outward end 26 of the nozzle member to communicate with the nozzle openings 32. The heater 10 is preferably formed of a beryllium copper alloy which transfers sufficient heat from the heater element 25 to maintain the plastic in radial channels 34 and nozzle openings 32 in a molten state.

Referring to FIG. 3 in more detail, in use the heater 10 is located in well 36 defined by cavity plate 38 and support plate 40. Cavity plate 38, together with the mold 42 also defined the cavities 14 in a conventional manner. The support plate 40 is secured to the cavity plate 38 by bolts 44 (only one of which is shown). On the opposite side of the heater 10, the spreader plate 16 is secured to the cavity plate 38 and the support plate 40 by bolts 46, (only one of which is shown). It is highly desirable to have uniform heat transfer in the heater 10, and therefore bolts 44, 46 should be equally tensioned to apply uniform pressure to the heater. As may be seen, an air gap 48 is defined between the support plate 40 and the spreader plate 16, the spreader plate being supported by the heaters 10. The cavity plate 38, support plate 40 and mold 42 are all formed of steel and are cooled by means (not shown) well known in the injection molding industry. The spreader plate 16 is also formed of steel but is heated by being in controlled contact under uniform pressure with heater 10 and the molten plastic passing through it, and therefore air gap 48 serves as insulation between the hot spreader plate 16 and the cool support plate 40. Similarly, an air space 50 is provided between the heater 10 and the wall 52 of the well 36 to insulate the heater from the cooled support plate 40. The heater 10 is also spaced from the wall 52 and the floor 54 of the well 36 in the cavity plate 38 to define a space 56 known as a "blind hole" which extends around and beneath the lower portion of the heater 10. This blind hole 56 fills with plastic during use, which serves as insulation between the heater 10 and the cooled cavity plate 38. Air space 50 is separated from the blind hole 56 by a sleeve 58, formed of a low conductivity steel, which is supported on circumferential shelf 59 in cavity plate 38 and which serves to accurately centrally position the heater 10 in the well 36. As may be seen, air space 50 extends to insulate sleeve 58 from support plate 40, while the blind hole 56 extends to insulate a portion of the sleeve 58 from heater block 10. Therefore, heat loss through sleeve 58 is reduced by having only a small upper portion 59 in bearing contact with heater 10 and a small lower portion 60 in bearing contact with cavity plate 38 to securely locate and support the heater 10. This structure securely maintains heater 10 in a central position in the well 36, while permitting slight horizontal movement of the spreader plate 16 relative to the heater block 10 to accommodate heat expansion of the spreader plate 16 due to the passage of the molten plastic through it. A seal 61 is provided between the spreader plate 16 and the heater 10 to avoid leakage of molten plastic during use.

As best seen in FIG. 4, the cavity plate 38 defines circular edge gates 62 which extend through lands 64 between the wall 52 of well 36 and cavities 14 adjacent each of the nozzle openings 32. The diameter of each edge gate 62 is preferably approximately twice the thickness of the corresponding land 64; in this embodiment 0.040 inches and 0.020 inches respectively. The edge gate 62, in turn, is generally smaller than the adjacent U-shaped nozzle opening 32 in the corresponding convex portion 30 of the nozzle member 24 of the heater 10.

In use, the heater 10 is located as shown in FIG. 3 to form container caps in cavities 14. Following the initial assembly of the apparatus shown with the mold 42, the heater 10 is heated by heater element 25, molten plastic is injected under very high pressure from the molding machine 18 to the spreader plate 16. As will be understood, this molten plastic flows through the spreader plate to several supporting heaters 10, only one of which is shown. The molten plastic passes through the central portion of the injection passage 20 in the heater block 10 and out through the radial channels 34 at the outward end 26 of the nozzle member 24 to the nozzle openings 32. The molten plastic will, of course, fill the blind hole 56 between the heater 10 and the wall 52 and floor 54 of the well 36 to provide insulation between the hot heater 10 and the surrounding cool steel support and cavity plates 40, 38. The pressurized molten plastic will flow through the nozzle openings and the corresponding edge gates 62 to fill the cavities 14. Due to the very high pressure of the molten plastic, of the order of 10,000 to 20,000 psi, this injection flow occurs nearly instantaneously. The pressure is then released and as the steel cavity plate 38 and mold 42 are cooled as described above, the plastic quickly solidifies in the cavities to form the container caps, which are then removed from the mold. During removal of the caps, the plastic in the spreader plate 16 and the heater 10, including that in the radial channels 34 and nozzle openings 32 remains in a molten state. However, as best seen in FIGS. 4 and 5, following the rapid flow of plastic through the edge gates 62, the plastic remaining in the edge gates 62 solidifies to form small sprues 66 which block the flow of molten plastic into the cavities 14 during removal of the caps.

Following removal of the formed caps from the cavities 14 and reassembly of the mold 42, high injection pressure is reapplied to the molten plastic from the molding machine 18, which causes the sprues 66 to be forced into the respective cavities 14, followed by another injection of molten plastic. The sprues 66 are sufficiently small so as to be partially or completely melted by the injected molten plastic thereby not deteriorously effecting the quality of the caps. During the second and successive injections, plastic will not flow into the blind hole 56 surrounding the nozzle member 24 of the heater 10, as the blind hole remains filled with plastic from the first injection. The alternate steps of injection of molten plastic under high pressure and removal of the solidified caps from the cavities 14 is continued in rapid succession to quickly produce a desired number of caps. It is to be understood that the product could equally as well be a variety of articles which are suitable for edge gate molding.

As is apparent, the heat transfer conditions adjacent the edge gates 62 are critical in order to allow solidified sprues 66 of a minimum size to be formed to block the flow of the molten plastic during removal of the formed product from the cavities 14. In addition, the heat provided by the heater 10 must be balanced with cooling from the cavity plate 38 to allow the molten plastic to quickly solidify in the cavities 14. These factors become more critical in view of the very small dimensions involved, particularly the thickness of lands 64. It has been found that by gradually decreasing the size of the conical nozzle member 24 towards the outward end 26 and providing convex portions 30, sufficient but not excessive heat transfer from the main body portion 22 of the heater block 10 may be provided to maintain the plastic in the radial channels 34 and nozzle openings 32 in a molten state. The provision of the convex portions 30 of the nozzle member 24 serves to conduct a minimum amount of heat necessary to the points adjacent the cavities 14, while providing a maximum volume of cooled cavity plate 38 between the nozzle member and the cavities 14. It is apparent from FIG. 5, that a nozzle member 24 with a circular outward end 26 would transfer a greater amount of heat to the area adjacent the cavities 14, and in addition would reduce the volume of the cavity plate 38 providing cooling in the area. Although other shapes of longitudinal portions 30 may provide satisfactory heat transfer, the convex shape shown has been found to be preferable as it facilitates formation of nozzle member 24 and adjacent well 36 in the cavity plate 38. As may be seen in FIG. 5, undesirable heat transfer from nozzle member 24 to cavity plate 38 is reduced by the insulation provided by the plastic in blind hole 56. The operation of the heater block 10 has been found to be satisfactory if the nozzle openings 32 are formed to be somewhat larger in size than the edge gates 52 with which they are aligned.

Figure 2:
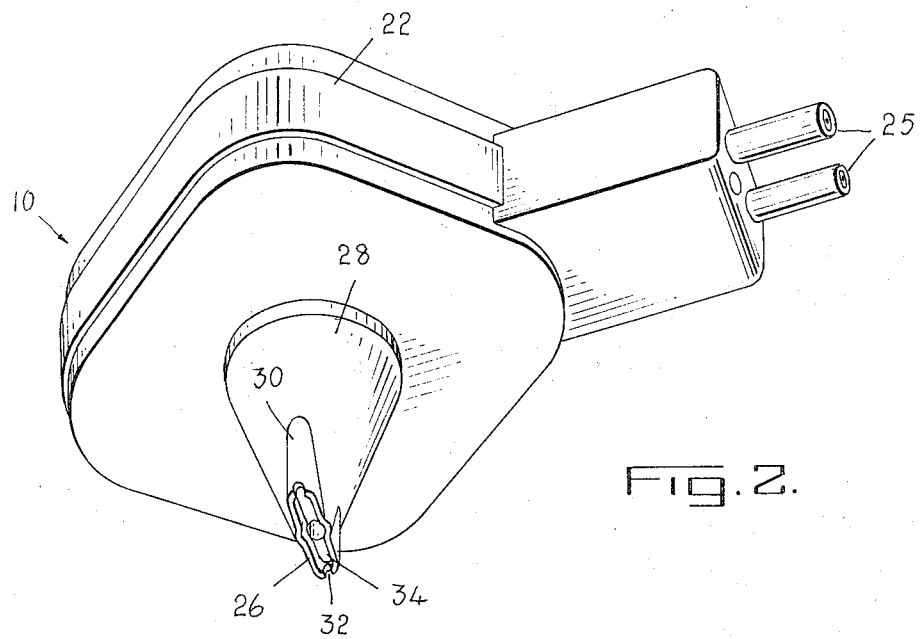
FIG. 2 is a perspective view of a heater according to a second embodiment of the invention.

The embodiment of the heater 10 shown in FIGS. 2, 6 and 7 differs from the embodiment described above in that the conical nozzle member 24 is shorter in length with a greater slope, and has only two, rather than four, convex portions 30 and nozzle openings 32. The operation of this embodiment is similar to the operation of the embodiment described above, and the description thereof need not be repeated. It is pointed out, however, that the optimum shape and dimensions of the various members and portions to provide the desired balance between heating and cooling will vary with such factors as the composition of the material being injected, the injection pressure and temperature, the product being formed, and the material of which the heater block is formed.

Although the disclosure describes and illustrates preferred embodiments of the invention, it is to be understood that the invention is not restricted to these particular embodiments.

What I claim is:

1. In a hot runner edge gate injection molding manifold system, a heater having a nozzle member extending integrally from a main body portion and an injection passage extending therethrough, the main body portion of the heater having heating means, the nozzle member being generally conical shaped with a truncated outward end and having a plurality of radially spaced longitudinally extending convex portions, each of said convex portions defining a nozzle opening adjacent the outward end of the nozzle member, each of the nozzle openings being in fluid communication with the injection passage.

2. In a hot runner manifold system, a heater as claimed in claim 1 wherein the injection passage extends centrally through the main body portion and the nozzle member to the outward end of the nozzle member whereat it communicates radially with each of the nozzle openings in the convex portions.

3. In a hot runner manifold system, a heater as claimed in claim 1 wherein the nozzle openings are U-shaped and extend inward from the outward end of the nozzle member, each nozzle opening being radially centrally located on the corresponding convex portion.

4. In a hot runner manifold system, a heater as claimed in claim 1 wherein the nozzle member has four equally radially spaced convex portions and corresponding nozzle openings.

5. In a hot runner manifold system, a heater as claimed in claim 1 wherein the heater block is formed of beryllium copper alloy.

* * * * *